UNITED STATES PATENT OFFICE.

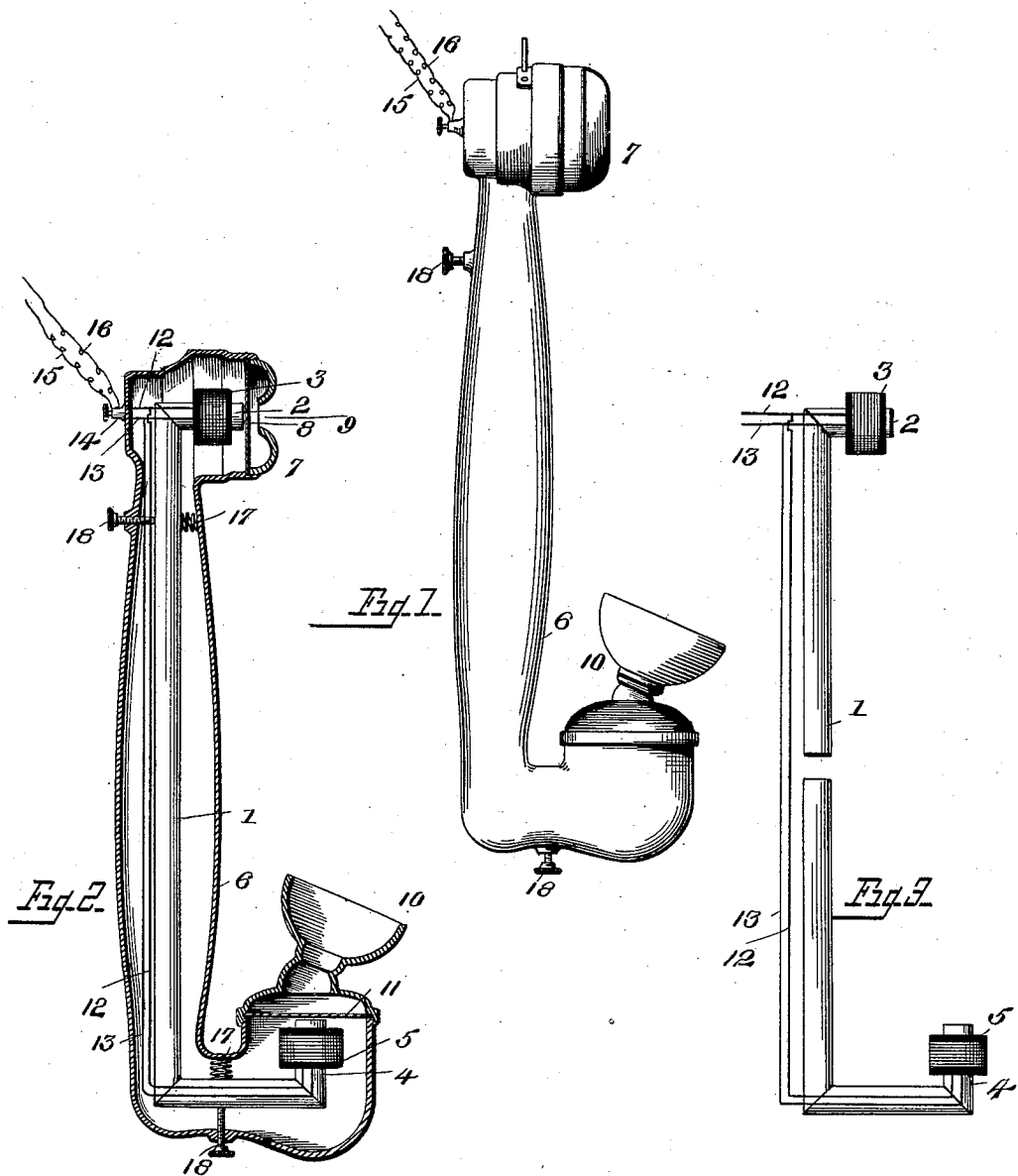

OLIVER HIGGINS, OF NAPOLEON, OHIO.

MAGNETIC TELEPHONE.

SPECIFICATION forming part of Letters Patent No. 529,174, dated November 13, 1894.

Application filed July 16, 1894. Serial No. 517,743. (No model.)

*To all whom it may concern:*

Be it known that I, OLIVER HIGGINS, of Napoleon, county of Henry, and State of Ohio, have invented certain new and useful Improvements in Magnetic Telephones; and I do hereby declare that the following is a full, clear, and exact description of the invention, which will enable others skilled in the art to which it appertains to make and use the same, reference being had to the accompanying drawings, and to the figures of reference marked thereon, which form a part of this specification.

My invention relates to a magnetic telephone, and has for its object, to provide an instrument in which the receiver and transmitter are combined in a single case, wherein when the receiver is in proper position at the ear, the transmitter is in position in front of the mouth, together with an adjustment by which the field of the magnet is regulated.

The invention consists in combining in a single case the receiver and transmitter, the case serving as a covering for the magnet, which consists in a permanent magnet extending preferably the entire length of the case, the spools being upon each end of the same, there being an adjustment by which the distance between the ends of the magnet and the diaphragm in the receiver and transmitter, respectively, is adjusted.

The invention further consists in the parts as shown, described and claimed.

In the drawings: Figure 1 is an elevation of the complete apparatus as comprising a receiver and transmitter constructed in accordance with my invention. Fig. 2 is a sectional elevation of the same, showing the form and arrangement of magnet, spools, and adjusting mechanism. Fig. 3 is a detail view of the magnets and spools, showing a modified form comprising separate magnets for the receiver and transmitter.

1 designates the magnet, which has a right-angled upper end 2, upon which is a spool 3, the lower end 4, being in parallel relation to the body of the magnet, and upon the same is a spool 5.

6 designates the case which covers the magnet, the case being formed of non-conducting material, the upper end receiving the cap 7, between which and the case is interposed the diaphragm 8, the cap having a central opening 9 through which the sound vibrations pass to the ear.

Upon the lower end of the case is secured the mouth piece 10, there being a diaphragm 11 interposed between the mouth piece and the case.

12 and 13 designate the wires leading from spools 3 and 5 to the binding post 14, from which pass the line wires 15 and 16 respectively, leading to a like instrument to that described above.

In order that the field of the magnet may be adjusted, the magnet 1 is held away from both diaphragms by springs 17, and adjusted to the diaphragm by the set screws 18. Therefore, as the screws are turned outwardly, the spring forces the magnet toward the screw, thereby increasing the distance between the diaphragm and the end of the magnet and vice versa.

In Fig. 3 is shown a modification comprising separate magnets for the transmitter and receiver.

It will thus be seen that I have provided an instrument comprising a transmitter and receiver within one case having means for adjusting the field of the magnets as desired, and therefore providing a magnetic telephone simple of construction, effective in operation, as when the ear is at the receiver, the transmitter is directly in position in front of the mouth, a position absolutely necessary in a magnetic telephone.

What I claim is—

1. In a magnetic telephone, a magnet having spools upon each end of the same, a case covering the magnet, diaphragms at each end of the same, and caps secured at each end of the case holding the diaphragm in place.

2. In a magnetic telephone, a permanent magnet, a case covering the same, a receiver and transmitter mechanism in opposite ends of the case, set screws for adjusting the magnet relative to the case for regulating the field of the same.

In testimony that I claim the foregoing as my own I hereby affix my signature in presence of two witnesses.

OLIVER HIGGINS.

Witnesses:
 F. D. PRINTIS.
 LURELLA HIGGINS-PRINTIS.